(12) United States Patent
Kodimer et al.

(10) Patent No.: US 10,027,841 B1
(45) Date of Patent: Jul. 17, 2018

(54) SYSTEM AND METHOD FOR DOCUMENT PROCESSING DEVICE ADMINISTRATION

(71) Applicants: Kabushiki Kaisha Toshiba, Minato-ku (JP); Toshiba TEC Kabushiki Kaisha, Shinagawa-ku (JP)

(72) Inventors: Marianne Kodimer, Huntington Beach, CA (US); Hsiao-Hsuan Yu, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/440,517

(22) Filed: Feb. 23, 2017

(51) Int. Cl.
 *G06F 3/12* (2006.01)
 *H04N 1/32* (2006.01)
 *H04N 1/00* (2006.01)
 *G06Q 30/04* (2012.01)

(52) U.S. Cl.
 CPC ........... *H04N 1/3208* (2013.01); *G06Q 30/04* (2013.01); *H04N 1/00323* (2013.01); *H04N 1/00344* (2013.01); *H04N 2201/0094* (2013.01); *H04N 2201/3202* (2013.01); *H04N 2201/3205* (2013.01); *H04N 2201/3208* (2013.01); *H04N 2201/3253* (2013.01)

(58) Field of Classification Search
 CPC ............. H04N 1/3208; H04N 1/00323; H04N 1/00344; H04N 2201/0094; H04N 2201/3202; H04N 2201/3205; H04N 2201/3208; H04N 2201/3253; G06Q 30/04
 USPC ........................................................ 358/1.15
 See application file for complete search history.

(56) References Cited

U.S. PATENT DOCUMENTS

| | | | |
|---|---|---|---|
| 2010/0309510 A1* | 12/2010 | Hansen | G06F 3/1203 358/1.15 |
| 2013/0036170 A1* | 2/2013 | Hori | G06F 3/1204 709/204 |
| 2015/0070725 A1* | 3/2015 | Monden | G06F 3/1232 358/1.15 |

* cited by examiner

*Primary Examiner* — Neil R McLean
(74) *Attorney, Agent, or Firm* — Ulmer & Berne LLP

(57) ABSTRACT

A system and method for registering network devices in accordance with customer identification includes a network interface that receives device identification data corresponding to a newly installed multifunction peripheral. The network interface also receives incoming location data corresponding to a physical location of the multifunction peripheral. A memory stores customer list data corresponding to identification of existing customers associatively with stored location data corresponding to existing customer locations. A processor compares incoming location data against the customer list data and associates a customer name with received identification data in accordance with a comparison of the incoming location data and the customer list data.

14 Claims, 10 Drawing Sheets

500

504 — COMPANY: TOSHIBA AMERICA BUSINESS SOLUTIONS, INC.

508 — ADDRESS:
    COUNTRY: UNITED STATES
    STATE: CA
    PROVINCE: N/A
    CITY: IRVINE
    STREET ADDRESS: 9740 IRVINE BLVD.
    POSTAL CODE: 92618-1608

512 — CONTACT PHONE: +1 949 583 3000

514 — LOCATION AREA CODE: 949

518 — LOCATION EXCHANGE(S): 462, 583, 587

522 — DOMAIN: tabs.toshbia.com

526 — CONTACT EMAIL: webmaster@tais.toshiba.com

546 — LOCATION ADDRESS GPS COORDINATES: 33.659671, -117.707196

550 — PREMISES GPS RANGE:
    33.659833393294306 -117.70978975302569
    33.6606192358977 -117.70906019217364
    33.6609675048106 -117.7060990334212
    33.65665244343419 -117.70530080808385

530 — DOMAIN IP ADDRESS: 64.70.83.71
534 — SUBNET MASK: 255.255.252.0 (1,024 DEVICES)

538 — PRIMARY DNS: TAIS-DNS-P01.TAIS.NET
542 — SECONDARY DNS: TAIS-DNS-P02.TAIS.NET

CUSTOMER DEVICE LIST: [LINK]

CUSTOMER DEVICE CONFIGURATIONS: [LINK]

FIG. 5

SYSTEM AND METHOD FOR DOCUMENT PROCESSING DEVICE ADMINISTRATION

TECHNICAL FIELD

This application relates generally to systems and methods for document processing device administration system.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs, while moveable, are generally maintained in a fixed location once installed. Given the expense in obtaining and maintain MFPs, devices are frequently shared or monitored by users or technicians via a data network. When initially introduced, MFPs were typically purchased by end users, such as businesses. A device owner would maintain the device, purchase replacement consumables, such toner, ink or paper, and restock the device as needed. Certain device failures or errors, such as paper jams, might be relatively easily attended to by relatively sophisticated end users themselves. More complex failures or errors required the end user to place a call into a technician and pay for an on-site service call. Not only can this be expensive, but a device may be out of commission for an extended period while waiting for a technician to arrive. This could be extremely problematic in situations wherein no alternative device is available of use during an outage.

Larger companies may have two or more MFP devices available to them. Companies with many devices may have had their own, on-site technicians to keep their systems functional. For full time technician support could add significant cost overhead. Keeping technicians available when needed could result in an underutilized employee when devices are functioning properly. As devices become more powerful, they become more complex. Accordingly, an investment also had to be made in keeping technician training current.

Due to factors such as those noted above, the office machine business moved to a model wherein devices are owned, maintained and serviced by third party providers. Devices are monitored remotely via a network, such as the Internet. Device failures are monitored and technicians, who can support many customers over many locations, are dispatched as needed. Customers may simply be billed for device usage, such as for a number of pages printed or copies made.

With the forgoing business model, device service providers are incentivized to be as efficient in the care and maintenance of their devices as possible.

SUMMARY

In accordance with an example embodiment of the subject application, a system and method for registering network devices in accordance with customer identification includes a network interface that receives device identification data corresponding to a newly installed multifunction peripheral. The network interface also receives incoming location data corresponding to a physical location of the multifunction peripheral. A memory stores customer list data corresponding to identification of existing customers associatively with stored location data corresponding to existing customer locations. A processor compares incoming location data against the customer list data and associates a customer name with received identification data in accordance with a comparison of the incoming location data and the customer list data.

BRIEF DESCRIPTION OF THE DRAWINGS

Various embodiments will become better understood with regard to the following description, appended claims and accompanying drawings wherein:

FIG. 5 is an example embodiment of a data record;

DETAILED DESCRIPTION

Figure 1:
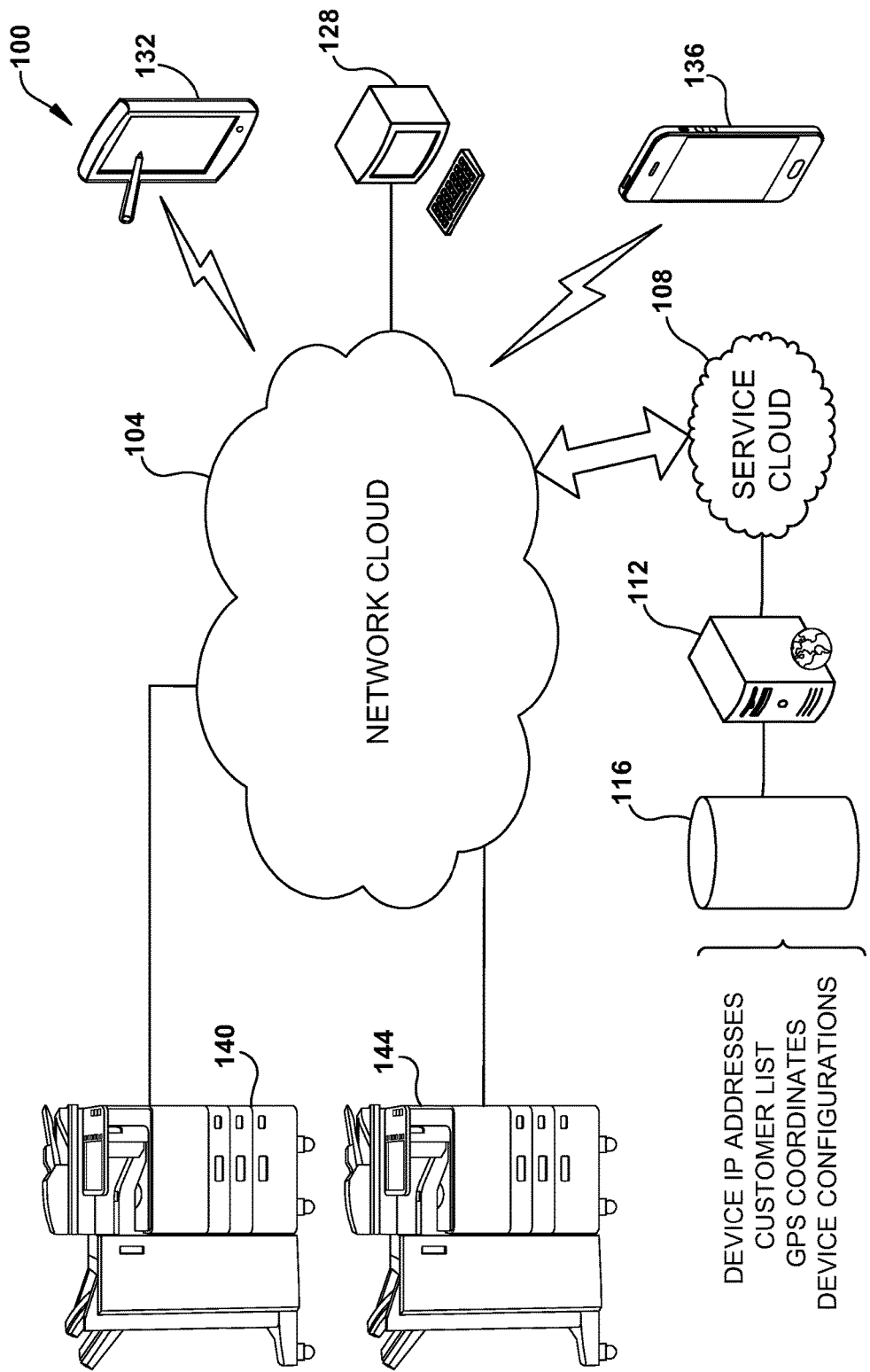
FIG. 1 an example embodiment of a network or cloud-based device service or administration system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

As discussed above, a current business model for office devices such as MFPs is for remote device administration. This may be done by a third party device administrator that works for multiple clients. It is important that an administrator have an accurate record of devices under their care. An administrator may monitor or service hundreds or thousands of devices located across wide geographic areas. Devices must be accurately registered to allow for billing, for device maintenance or servicing, for preventative maintenance, or for supply of consumables. Device information may be stored in a cloud-based server system. When a new device is added to a customer's system, information as to that device and the customer with which it has been associated must be supplied to the server database.

Using a service application such as Toshiba TEC's eBridge Cloud Connect, data corresponding to hardware devices such as MFPs is imported into a cloud-based system for the purpose of remote monitoring, diagnosis, control, and maintenance. Service engineers commonly need to solve a problem relating to a specific device located at a remote customer site. Using a device-centric model the devices are displayed on a cloud-based server user interface, and are shown and identified by their hardware properties such as serial number, IP Address, Mac address, or the like. This allows the service engineer an easy method of identifying or looking up a device in the system.

There are cases, such as with the task of meter collection, customer preferences, and ordering preferences, when settings are configured which pertain to a particular customer site and not any one single device. In this case the service engineer would like to configure a customer's particular settings as opposed to device settings. This cannot be accomplished easily with a device-centric view.

Applying settings and configurations to the customer of a cloud-based system that utilizes a device-centric view is tedious and prone to error. It requires the administrator to select devices, create customer groups, manage the group membership and maintain the group assignments. The subject application teaches example embodiments that automatically build, verify and validate device information and which maintain a customer-centric view from device properties of an existing device-centric view cloud-based system.

The subject application teaches example embodiments of systems and methods by which a device-centric cloud-based service automatically generates and maintains a customer-centric view based on the properties of the existing devices. By using information such as customer name or identifier, dealer name, physical address, GPS location, IP address, or other location indicator of each device of the system, a customer list is generated, verified, validated and maintained. This automatic creation will help eliminate user error and aggravation that would otherwise result from manually creating a customer list and assigning members. Further, the customer list is suitably updated dynamically as triggered by a device customer name change, device import, and device commission. As a result, an accurate list of customers is maintained.

In accordance with the subject application, FIG. 1 illustrates an example embodiment of a network or cloud-based device service or administration system 100 that includes a network cloud 104 suitably comprised of a local area network (LAN), wide area network (WAN), the Internet, or any suitable combination thereof. Associated with network cloud 104 is service cloud 108, suitably comprised of one or more cloud servers 112 with an associated database 116. Database 116 suitably stores device and customer data, such device IP address, customer list, GPS coordinates and configuration information as will be detailed further below.

Networked MFP devices, such as MFP 140 and MFP 144, are in data communication with service cloud server 112 via network cloud 104 via service cloud 108. Technicians or service engineers suitably access information via data devices such as computer workstation 128, tablet computer 132 or smartphone 136.

Figure 2:
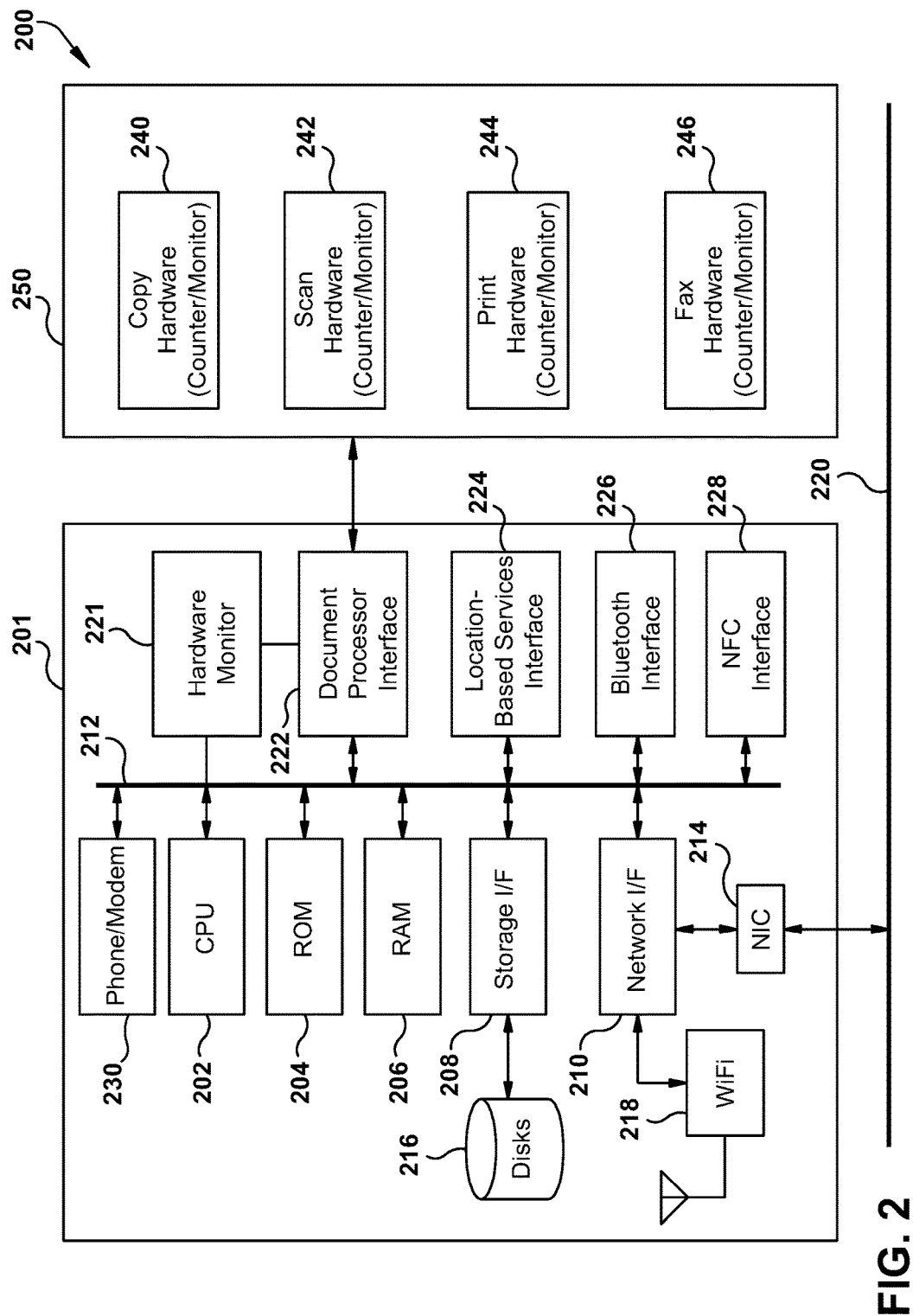
FIG. 2 is an example embodiment of a document rendering system.

Turning now to FIG. 2, illustrated is an example embodiment of a document rendering system 200 suitably comprised within an MFP, such as with MFPs 140 and 144 of FIG. 1. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 can also be in data communication with BLUETOOTH interface 226, and NFC interface 228, either directly as shown or through network interface 218 (not shown). Processor 201 is also suitably in data communication with a phone or modem interface 230, suitably enabled for wireless or wired telephone communication of data or voice.

Processor 202 can also be in data communication with any suitable user input/output (I/O) interface which provides data communication with user peripherals, such as displays, keyboards, mice, track balls, touch screens, or the like. Hardware monitor 221 suitably provides device event data, working in concert with suitably monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216.

Also in data communication with data bus 212 is a document processor interface 222 suitable for data communication with MFP functional units 250. As noted above, document processor interface is suitable for input of graphical information as detailed above, and may be comprised of a touch screen interface. In the illustrate example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Additional interfaces are suitably provided within controller 201 include a location-based services (LBS) interface 224. Data relative to device location is suitably channeled to controller 201 vial LBS interface 224 from any suitable location system. By way of example, location may be determined by Global Positioning System (GPS) information, cellular location information or network location information, or a combination thereof. Location information is also suitably determined outside of the MFP, such as by a technician who inputs device location information directly to the device.

Figure 3:
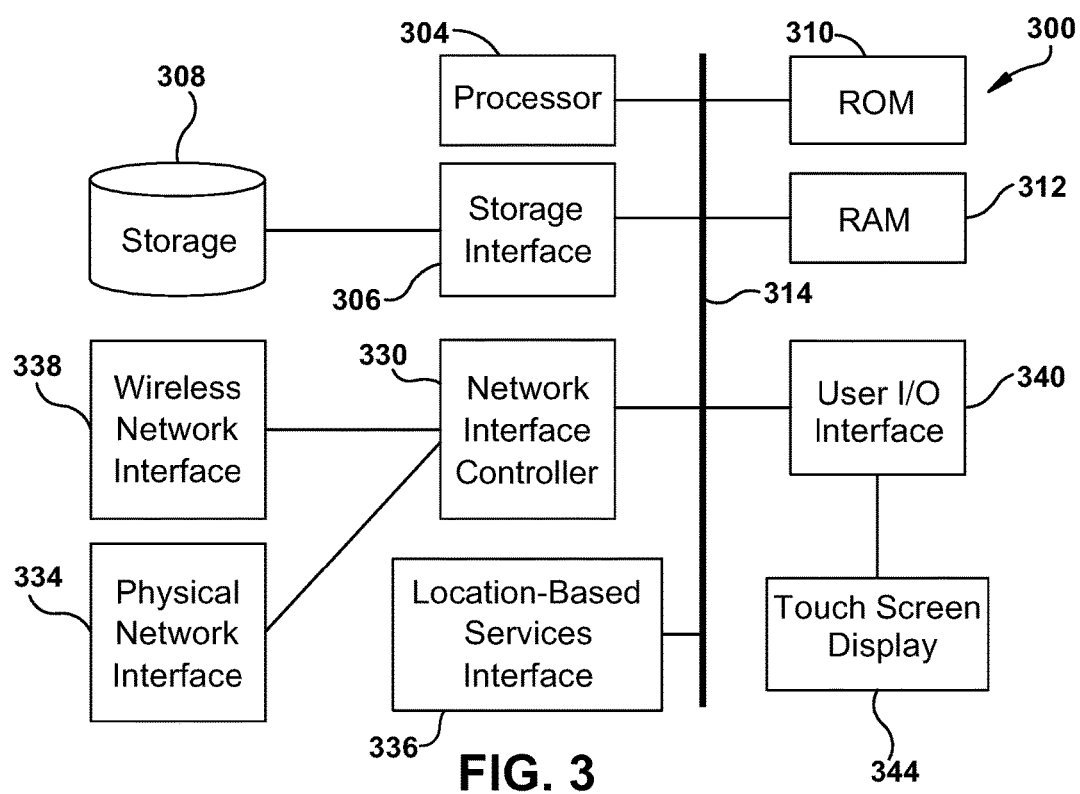
FIG. 3 is an example embodiment of a digital device.

Turning now to FIG. 3, illustrated is an example embodiment of digital devices such as workstation 128, tablet computer 132 or smartphone 136, as well as constituents of service cloud server 112 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334, or to any suitable wireless data connection via wireless network interface 338, such as one or more of the networks detailed above. Such systems may also include a LBS services interface 336, such as those described above. Providing location services to mobile devices, such as may be used by a technician, may provide location information relative to a new MFP installation when being done by such technician. This may provide location information in situations as will be detailed below when such location information is not available from the MFP device itself.

Processor 304 is also in data communication with a user input/output (I/O) interface 340 which provides data communication with user peripherals, such as display 344, as well as keyboards, mice, track balls, touch screens, or the like. It will be understood that functional units are suitably comprised of intelligent units, including any suitable hardware or software platform.

Figure 4:
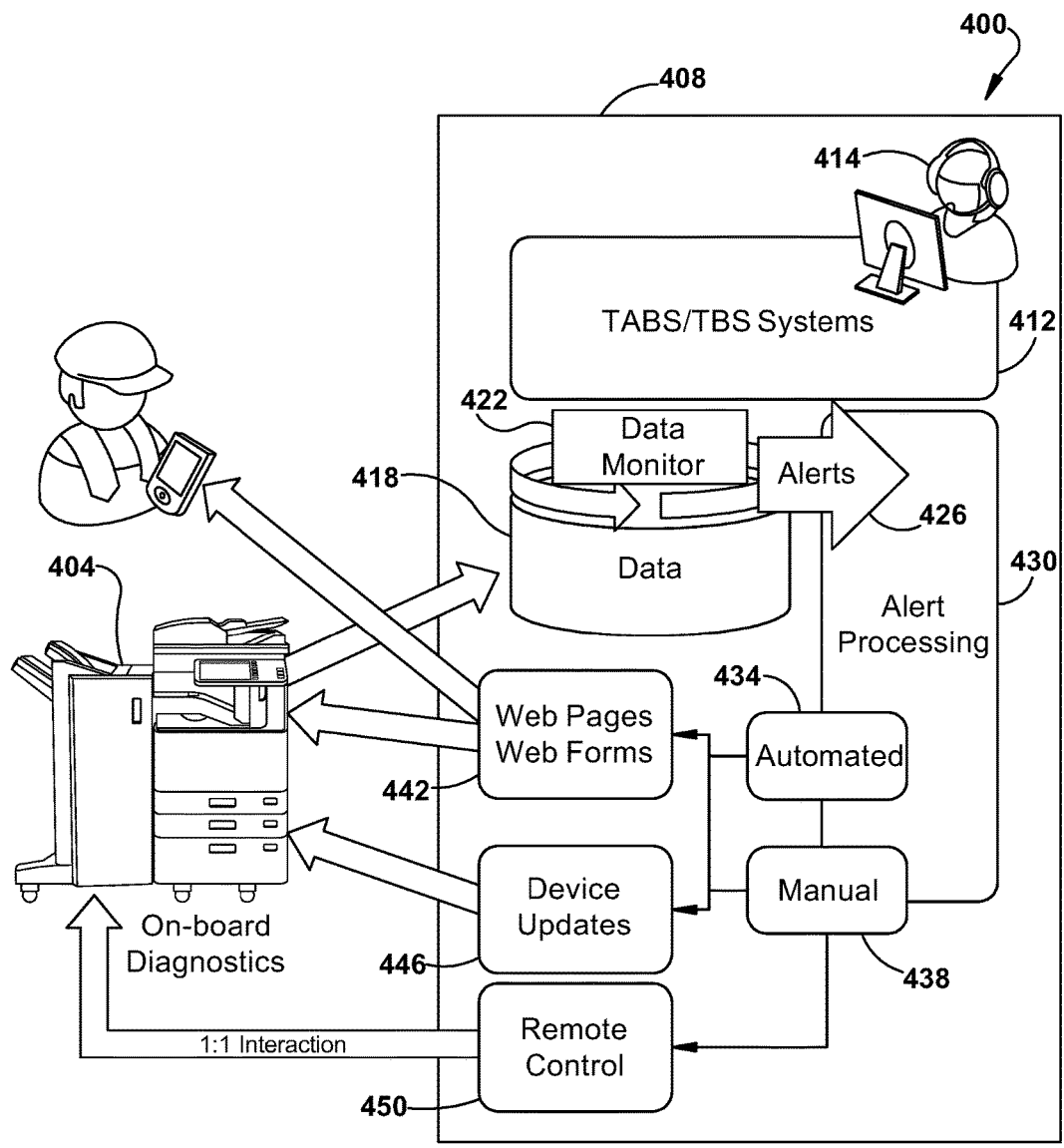
FIG. 4 is an example embodiment of a document processing device administration system.

Turning now to FIG. 4, illustrated is an example embodiment of a document processing device administration system 400. MFP 404 is in data communication with service cloud 408, including one or more associated cloud servers as taught in connection with FIG. 1. Service cloud 408 includes one or more document management systems 412, suitably supporting one or more technicians 414. Device data 418 from MFP 404 monitored at 422 and resultant alerts are processed at 430. Alerts include information relative to newly installed MFPs which may be automatedly identified and supplemented to data 418, either fully or with assistance from technician 414 at 434, or manually via technician 414 at 438. Further details relative to such identification will be provided below. Identified devices are available for relaying of web pages or web forms at 442, supplying of device updates at 446 or other device remote control at 450.

Turning next to FIG. 5, illustrated is an example embodiment of a data record 500 as may be resident for customers maintained in a service cloud such as detailed below. In the illustrated example, data for a customer includes more common information such as the company name 504 and mailing address 508, along with a general contact phone number 512. When a new device is added to a customer network, as noted above, it is advantageous to be able to identify easily a particular customer associated with the installation. A new installation may have such customer information already disposed in the device. Reasons this identification may be available include when the device was previously installed by the same customer or the device was preprogrammed with customer information prior to shipping. Identifying these devices to the service cloud can be fully automated in these situations. However, it may be advantageous to verify that the device still belongs to the same customer or that the device was shipped and is being installed at the correct, target location.

In situations were no previous customer information is resident on a newly installed MFP, or in situations where it is advantageous to verify a prior customer identification on the device, example embodiments herein available information to determine a location of the installed device relative to known or discoverable customer locations. Such information as to device location may be gleaned from telecommunications information which may include telephone information or networking information, alone or in combination. Contact phone number 512, if preexisting on a MFP, may provide useful location information if it is accurate relative to a location of device installation. Location may be more coarse, such as discernable from area code 514, or more refined such as from exchanges 518 that are associated with geographic areas disposed within that associated with an area code. As noted above, even if present, telephone-related information may not necessarily be accurate and may benefit by verification.

When MFPs are associated with a local modem or phone connection, a call to the service cloud can provide telephonic information, such as via caller ID. This can be used to determine an area code, or an area code and an associated exchange, or used to verify information that was present on the device. This information may then be used to determine if one or more service cloud customers are serviced by the service cloud. If only one customer is, then it can be concluded with some certainty that the device is being added to that customer's inventory. If not, candidate customers are suitably identified and can then be selected from a listing sent to a service cloud technician. In the event that the device initiates a cellular call, location information may be available via an associated cellular network. By way of example, once a cell call is placed, the information is available in the cellular network as to which tower is communicating with the device, along with the latitude and longitude of that tower. Further refining information is available as to which quadrant of the tower is active and signal strength of the wireless call. This may provide sufficient resolution to identify a customer, or provide a short list of candidate customers.

Geographic location information is also suitably provided by a GPS system integrated with an MFP, or with a device associated with the MFP, such as service technician's device during a device installation procedure. It will be appreciated that any suitable location mechanism, such as those examples detailed above, may also be present in a device secondary to but associated with an MFP to be identified.

Telecommunication networking information for an MFP may include domain name 522, email address 526, domain IP address 530 which may be supplemented by a subnet mask 534 to limit a number of associated devices, and also primary and secondary DNS servers 534 and 538. Information as to an owner associated with an IP address or domain may assist in identifying a device customer. A top level DNS server may include a record, such as a WHOIS record, identifying a customer. Networking information can also be gleaned by completing a ping or a trace route from the service cloud to a device, or from the device to a cloud server with the device reporting its findings to the cloud server.

Figure 6:
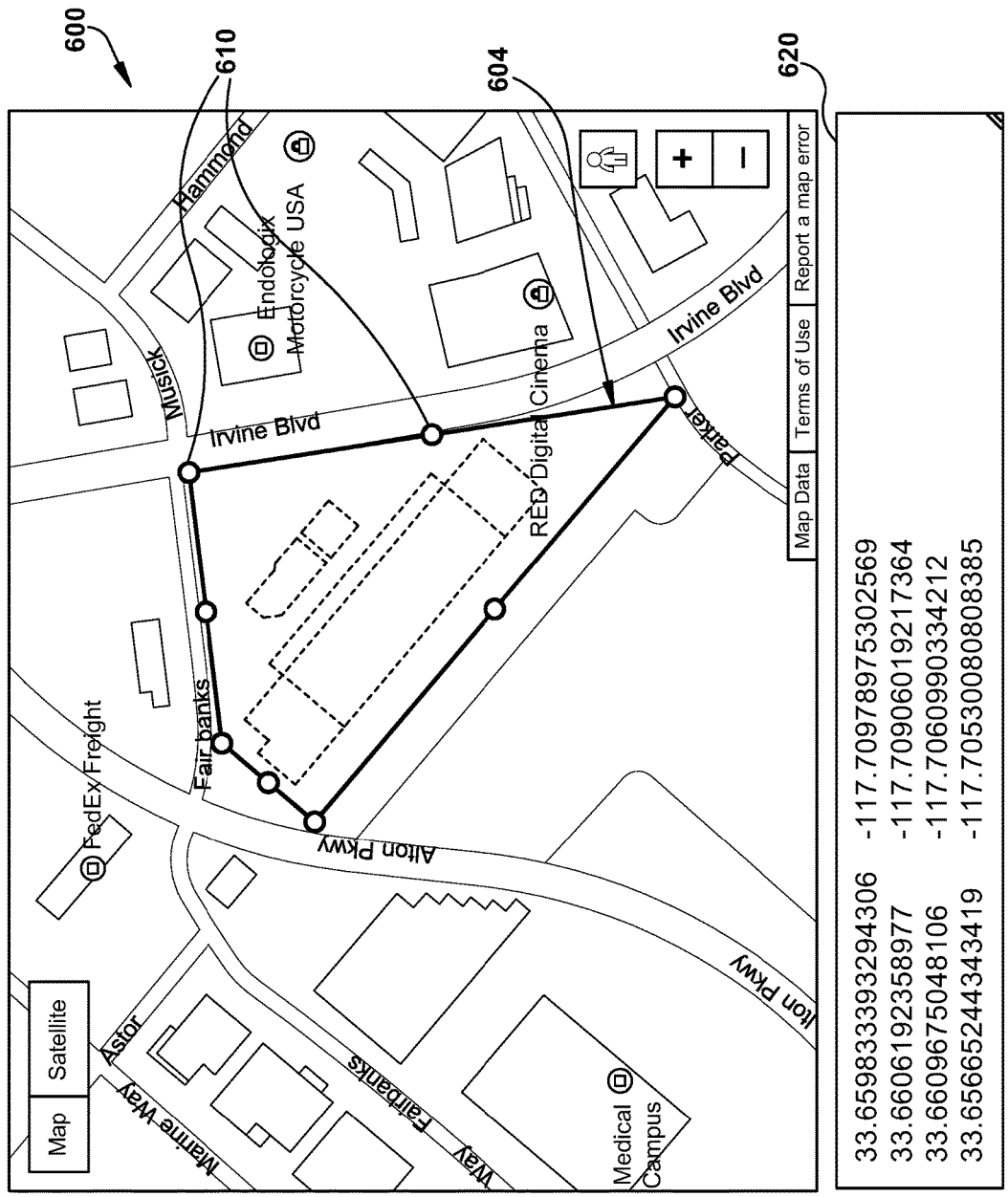
FIG. 6 is an example embodiment of a GPS boundary map.

Location information may also be determined by GPS information. A GPS subsystem comprised within an MFP or a device nearby an MFP may provide GPS coordinates, such as coordinates. This may be compared to known GPS coordinates 546 associated with a customer address. An acceptable range of device GPS coordinates versus customer location GPS coordinates is suitably set to determine likelihood that the newly installed device is on the premises. Alternatively, a customer may be identified with the nearest GPS coordinates, or candidate customer identities determined by identifying two or more nearest candidates which is suitably displayed along with relative distances. In certain instances, a more precise mapping of a customer location GPS range 550 may be available. Any device with GPS information bounded within this range would presumably be associated with that customer. With added reference to FIG. 6, map 600 includes a GPS boundary 604 defined by boundary points 610 which form boundary coordinate pairs 620 included in data record 500 of FIG. 5.

Figure 7:
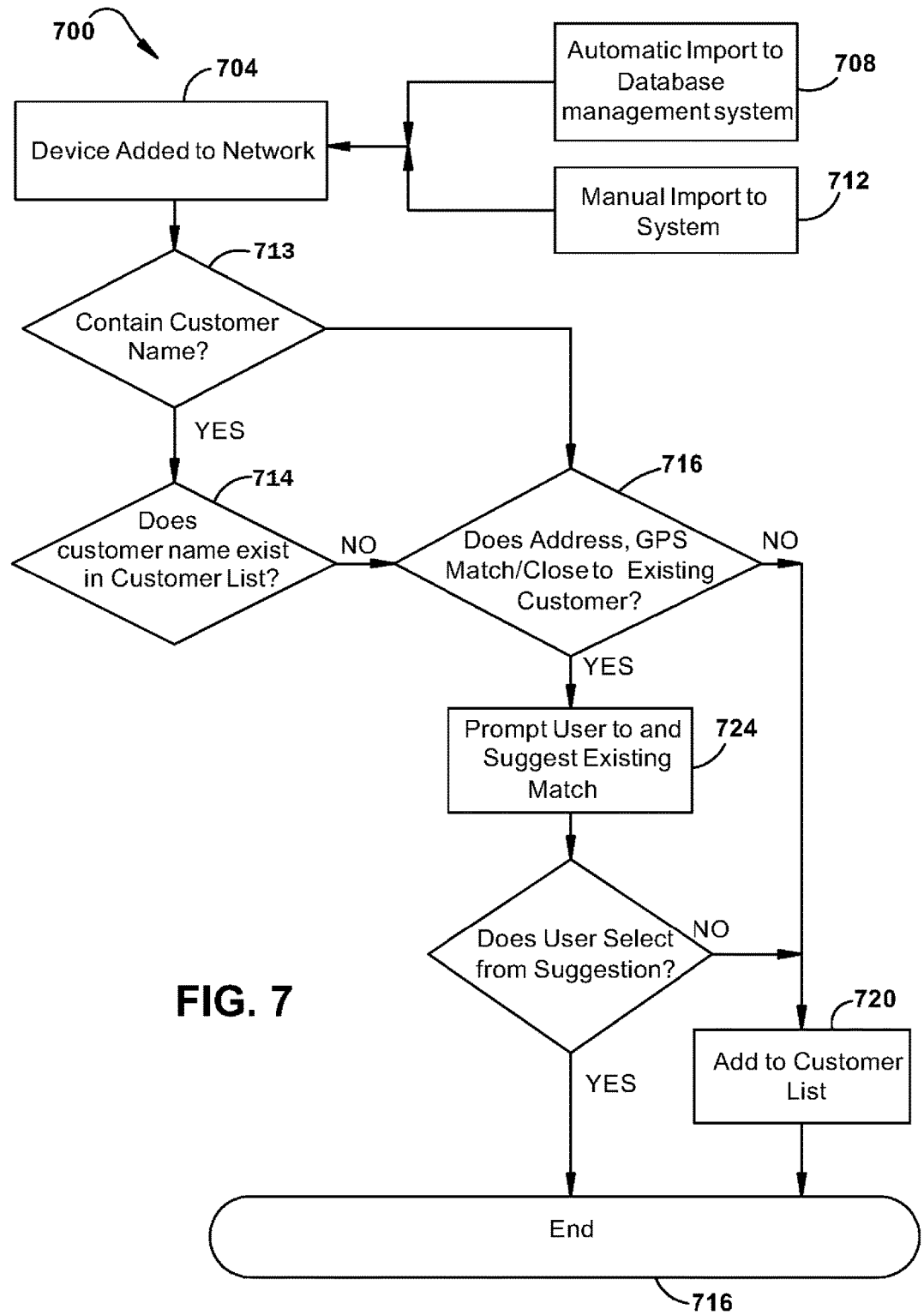
FIG. 7 is an example embodiment of a flowchart for identifying a network device.

Turning now to FIG. 7, illustrated is a flowchart 700 of a system for identifying a device such as an MFP when added to a network. When a device is added at block 704, an automatic import into a database management system of a service cloud may be made at block 708, an manual import may be made at 712, or a hybridized process wherein candidate devices are determined and presented as a list to a technician for selection or confirmation. A determination is made at block 713 if a customer name is present. If so, a determination is made at block 714 if that customer is already entered into the management system. If so, the process completes at block 716. If no customer name is identified as present at block 708, or if it is determined that the identified customer is not already known in block 712, progress is made to block 716 to determine if any suitable location information, such as GPS, is close to the device location. If not, the customer is suitably added to the database at block 720 and the process completes at 716. If so, one or more candidate customers are generated at block 724. If a customer is selected, the process is completed at block 716. If not, a customer name is added to the database at block 720 after which the process is completed at block 716.

Figure 8:
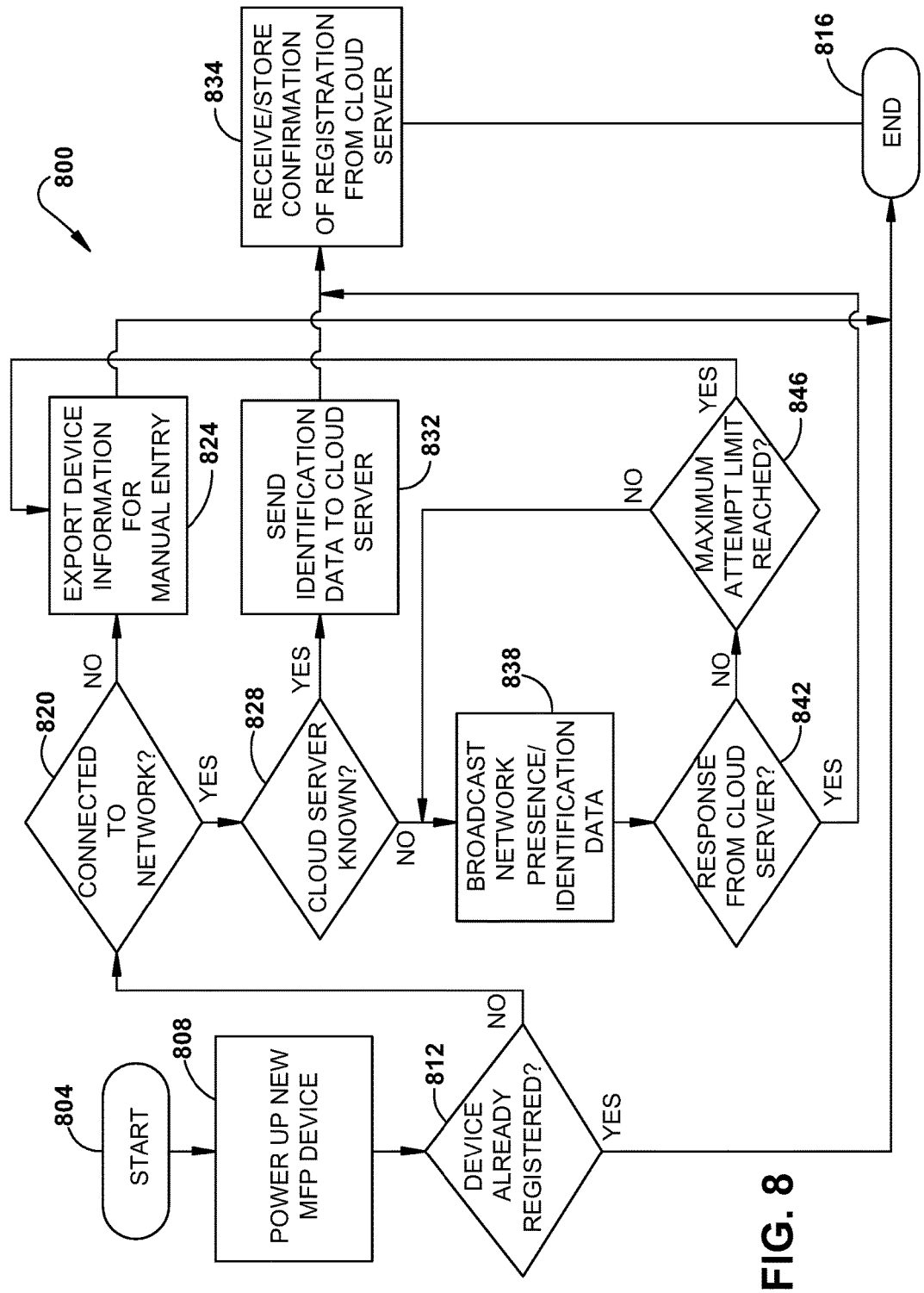
FIG. 8 is an example embodiment of a flowchart for identifying a network device.

Referring now to FIG. 8, illustrated is an example embodiment of a flowchart 800 for identification of a newly added device to a network by a broadcast or other initiated network contact initiated by the device upon installation. The process commences at block 804 and a newly installed device is powered up at block 808. A determination is made at block 812 whether the device was already registered. If so, the process may suitably terminate at block 816. However, it certain situations, it may be desirable to confirm this information. If the device is not registered, a determination is made at block 820 whether it is connected to network. If not, device information may be exported at block 824 for manual registration and the process is completed at block 816. When a network connection is present, a determination is made as to whether a known cloud server for a service cloud is present at block 828. If so, identification information is sent to that server at block 832 and confirmation of receipt/storage of this information is completed at block 834, after which the process ends at block 816. If no cloud server is known, a broadcast is suitably made at block 838. If a cloud server responds at block 842, progress is made back to block 834 for registration and confirmation. If not, additional attempts for a set number of attempts are suitably made via block 846 and a return to block 838.

Figure 9:
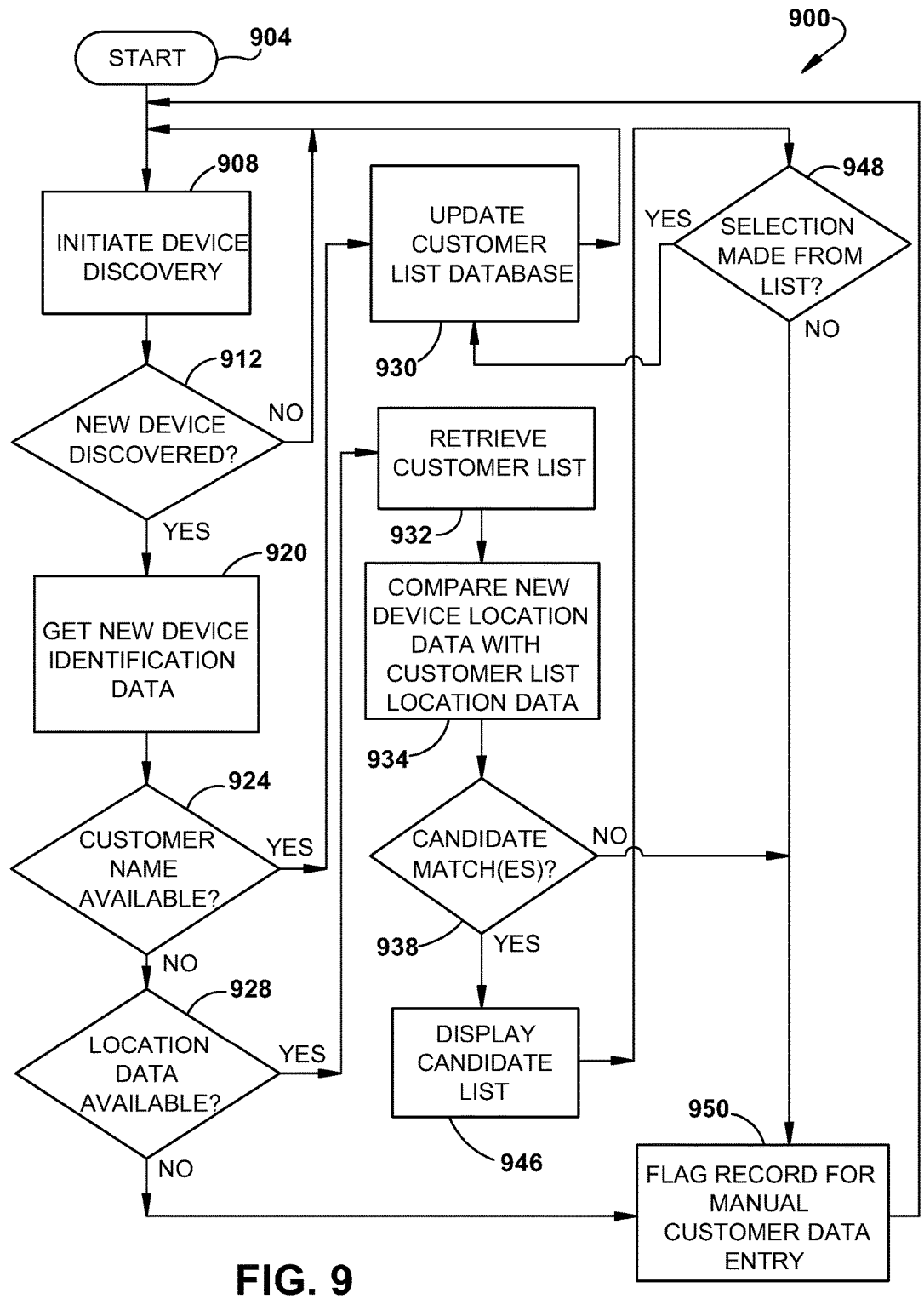
FIG. 9 is an example embodiment of a flowchart of server initiated device identification.

Referring next to FIG. 9, illustrated is an example embodiment of a flowchart 900 for discovery and registration of new devices initiated by a cloud server of a service cloud. The process commences at block 904 a server initiates a device discovery at block 908 by any suitable means, such as simple network management protocol (SNMP), device pinging, or the like. If a device is not discovered at block 912, device discovery is suitably recommenced at block 908. If so, device information is obtained at block 920. If a customer name is available at block 924, the device information is suitably updated to a database at block 930 and another check for new devices commenced at block 908. If not, a determination is made at block 928 as to whether location data is available. If so, prior customer information is retrieved at block 932 and a comparison is made with existing customer location data at block 934. If one or more candidate matches are present at block 938, a list is generated and displayed at block 946 and an administrator or technician selects or confirms a name at block 948. If no viable candidate is identified, progress is made to block 950 wherein the record is flagged for manual entry. Another check for devices is then suitably commenced at block 908. If no customer location data is determined to be available at block 928, progress also goes to block 950 for manual entry.

Figure 10:
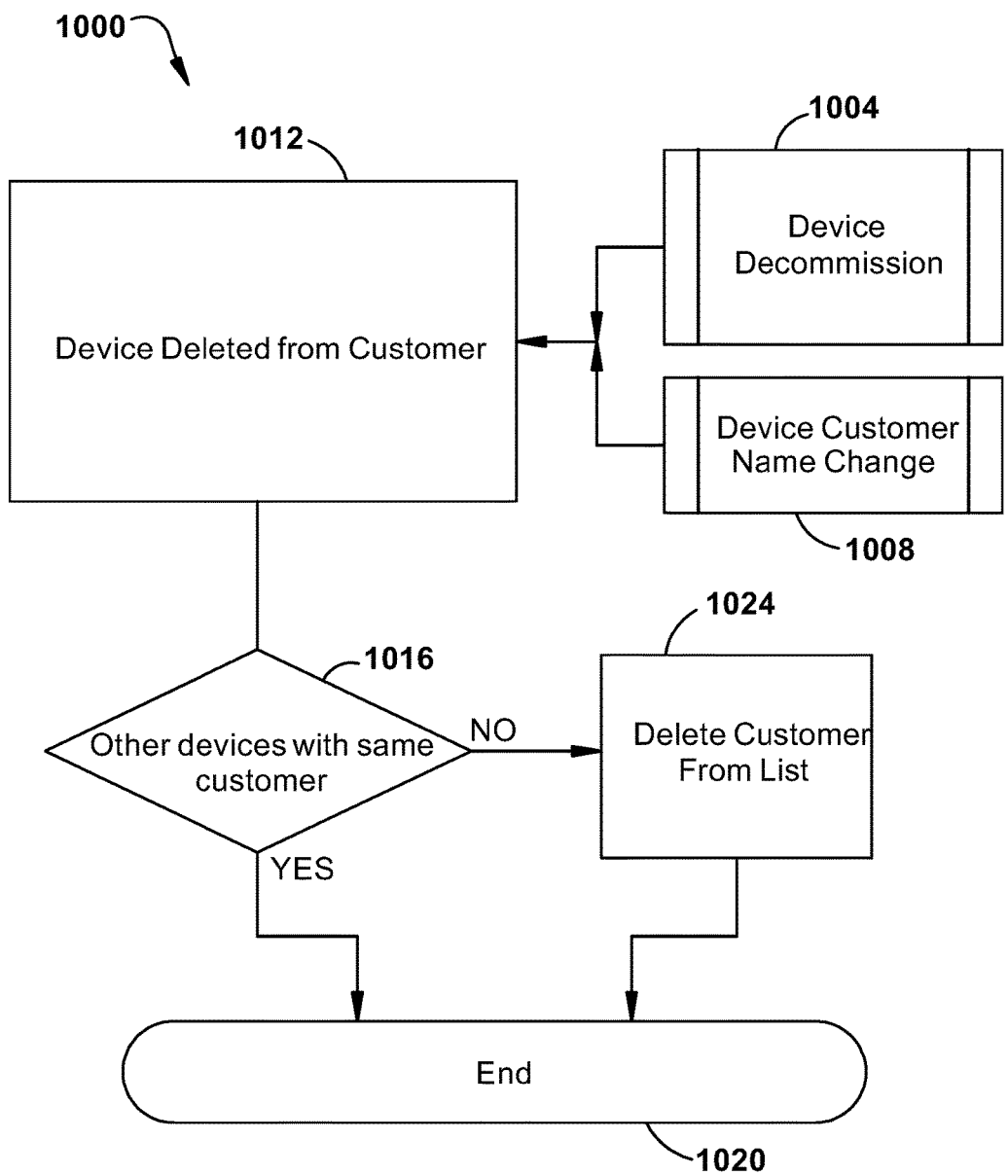
FIG. 10 is an example embodiment of a flowchart for deletion or deregistration of a device.

Turning next to FIG. 10, illustrated is an example embodiment of a flowchart 1000 for deletion or deregistration of a device. If a device is decommissioned at block 1004 or a customer name change is made at block 1008, this triggers a device deletion from an associated customer on the database at block 1012. If other devices exist with the same customer as determined at block 1016, the process is completed at block 1020. If not, that customer is suitably deleted from the data base at block 1024.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a network interface configured to
receive device identification data corresponding to a multifunction peripheral, and
receive incoming location data corresponding to a physical location of the multifunction peripheral;
a memory storing customer list data corresponding to identification of existing customers associatively with stored location data corresponding to existing customer locations;
a processor configured to
compare incoming location data against the customer list data,
associate a customer name with received identification data in accordance with a comparison of the incoming location data and the customer list data,
associate a customer name with received identification data in accordance with a comparison of the incoming location data with the stored location data, and
associate a plurality of candidate customer names with the received identification data;
a display configured to generate a list containing the candidate customer names;
an input configured to receive selection data corresponding to confirmed customer name selected from the list; and
the processor further configured to store the device identification data associatively with the confirmed customer name in the memory in accordance with the received selection data.

2. The system of claim 1 wherein the incoming location data and the stored location data comprise geographic coordinate data.

3. The system of claim 2 wherein the network interface is further configured to receive incoming location data comprised of GPS data generated by the multifunction peripheral.

4. The system of claim 1 wherein the incoming location data and the stored location data comprise telecommunication system data.

5. The system of claim 4 wherein the incoming location data and the stored location data comprise telecommunication routing data including IP address data.

6. A method comprising:
receiving device identification data corresponding to a multifunction peripheral via a network interface;
receiving incoming location data corresponding to a physical location of the multifunction peripheral via the network interface;
retrieving, from a memory, customer list data corresponding to identification of existing customers associatively with stored location data corresponding to existing customer locations;
comparing, via an associated processor, incoming location data against the customer list data;
associating, via the processor, a customer name with received identification data in accordance with a comparison of the incoming location data and the customer list data;
associating, via the processor, a customer name with received identification data in accordance with a comparison of the incoming location data with the stored location data;
associating, via the processor, a plurality of candidate customer names with the received identification data;
generating a list containing the candidate customer names on an associated display;
receiving selection data corresponding to confirmed customer name selected from the list; and
storing the device identification data associatively with the confirmed customer name in the memory in accordance with the received selection data.

7. The method of claim 6 wherein the incoming location data and the stored location data comprise geographic coordinate data.

8. The method of claim 7 further comprising receiving incoming location data comprised of GPS data generated by the multifunction peripheral via the network interface.

9. The method of claim 6 wherein the incoming location data and the stored location data comprise telecommunication system data.

10. The method of claim 9 wherein the incoming location data and the stored location data comprise telecommunication routing data including IP address data.

11. A system comprising:
a network interface configured to receive device identification data and incoming location data sent from a newly installed multifunction peripheral;
a memory storing customer list data corresponding to identification of existing customers associatively with stored location data corresponding to existing customer locations and document processing devices associated with the existing customers; and
a processor configured to
compare incoming location data against the customer list data,
associate a customer name from the customer list data with received identification data in accordance with a comparison of the incoming location data and the customer list data,
update the customer list data with the device identification data and associated customer name,
generate data corresponding to a plurality of candidate customer names in accordance with a comparison of the incoming location data against the customer list data, and
generate an image corresponding to the plurality of customer names on an associated display,
an input configured to receive selection data corresponding to a selected one of the candidate customer names;
the processor further configured to update the customer list data with the device data and the associated customer name comprised of the selected one of the candidate customer names; and
the network interface further configured to receive incoming location data comprised of location data input by an associated technician via a user interface of the newly installed multifunction peripheral.

12. The system of claim 11 wherein the incoming location data and the stored location data comprise telecommunication system data.

13. The system of claim 12 wherein the incoming location data and the stored location data comprise telecommunication routing data including IP address data corresponding to an IP address of the newly installed multifunction peripheral.

14. The system of claim 11 wherein the processor is further configured to generate a device discovery output via the network interface and wherein device identification data and incoming location data sent from a newly installed multifunction peripheral is received responsive to the device discovery output.

* * * * *